(12) United States Patent
Hoogland

(10) Patent No.: US 9,671,238 B2
(45) Date of Patent: Jun. 6, 2017

(54) NAVIGATION SYSTEM WITH A COMBINED NAVIGATION MECHANISM AND METHOD OF OPERATION THEREOF

(71) Applicant: Telenav, Inc., Sunnyvale, CA (US)

(72) Inventor: Isabelle Hoogland, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 107 days.

(21) Appl. No.: 14/673,325

(22) Filed: Mar. 30, 2015

(65) Prior Publication Data

US 2016/0290817 A1 Oct. 6, 2016

(51) Int. Cl.
*G01C 21/00* (2006.01)
*G01C 21/34* (2006.01)
*B60F 5/00* (2006.01)

(52) U.S. Cl.
CPC ..... *G01C 21/3423* (2013.01); *G01C 21/3492* (2013.01); *B60F 5/00* (2013.01)

(58) Field of Classification Search
CPC . G01C 21/3423; G01C 21/3492; B60F 5/003; B60F 5/02; B64C 37/00
See application file for complete search history.

(56) References Cited

U.S. PATENT DOCUMENTS

| | | | |
|---|---|---|---|
| 5,915,649 A * | 6/1999 | Head | B64C 37/00 244/17.17 |
| 6,799,094 B1 | 9/2004 | Vaida et al. | |
| 7,268,703 B1 * | 9/2007 | Kabel | G01C 21/203 340/984 |
| 8,630,751 B2 | 1/2014 | Bartley | |
| 2009/0216704 A1 * | 8/2009 | Zheng | G01C 21/20 706/52 |
| 2010/0280748 A1 * | 11/2010 | Mundinger | G06Q 10/047 701/532 |
| 2011/0036938 A1 * | 2/2011 | Blomeley | B64C 3/56 244/2 |
| 2012/0131212 A1 * | 5/2012 | Tang | G01C 21/3423 709/228 |
| 2014/0188788 A1 * | 7/2014 | Bridgen | G01C 21/3423 707/609 |

* cited by examiner

*Primary Examiner* — Michael J Zanelli
(74) *Attorney, Agent, or Firm* — IP Investment Law Group

(57) ABSTRACT

A navigation system includes: a control unit configured to calculate a non-terrestrial navigation route for guiding a multimodal vehicle during a non-terrestrial travel segment; calculate a ground navigation route for guiding the multimodal vehicle during a ground travel segment beyond a mode-transition point; generate a composite navigation route based on the non-terrestrial navigation route and the ground navigation route for continuously guiding the multimodal vehicle over the non-terrestrial travel segment and the ground travel segment; and an interface unit, coupled to the control unit, configured to communicate the composite navigation route.

17 Claims, 6 Drawing Sheets

NAVIGATION SYSTEM WITH A COMBINED NAVIGATION MECHANISM AND METHOD OF OPERATION THEREOF

TECHNICAL FIELD

The present invention relates generally to a navigation system, and more particularly to a system with a combined navigation mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services for ground-based automobiles.

However, navigation services for non-ground-based or multi-modal vehicles often cannot be reconciled with existing navigation solutions. Thus, a need still remains for a navigation system with a combined navigation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit, configured to calculate a non-terrestrial navigation route for guiding a multimodal vehicle during a non-terrestrial travel segment; calculate a ground navigation route for guiding the multimodal vehicle during a ground travel segment beyond a mode-transition point; generate a composite navigation route based on the non-terrestrial navigation route and the ground navigation route for continuously guiding the multimodal vehicle over the non-terrestrial travel segment and the ground travel segment; and an interface unit, coupled to the control unit, configured to communicate the composite navigation route.

An embodiment of the present invention provides a method of operation of a navigation system including: calculating, with a control unit, a non-terrestrial navigation route for guiding a multimodal vehicle during a non-terrestrial travel segment; calculating a ground navigation route for guiding the multimodal vehicle during a ground travel segment beyond a mode-transition point; generating a composite navigation route based on the non-terrestrial navigation route and the ground navigation route for continuously guiding the multimodal vehicle over the non-terrestrial travel segment and the ground travel segment; and communicating, with an interface unit coupled to the control unit, the composite navigation route.

An embodiment of the present invention provides a non-transitory computer readable medium including: calculating a non-terrestrial navigation route for guiding a multimodal vehicle during a non-terrestrial travel segment; calculating a ground navigation route for guiding the multimodal vehicle during a ground travel segment beyond a mode-transition point; generating a composite navigation route based on the non-terrestrial navigation route and the ground navigation route for continuously guiding the multimodal vehicle over the non-terrestrial travel segment and the ground travel segment; and communicating the composite navigation route.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
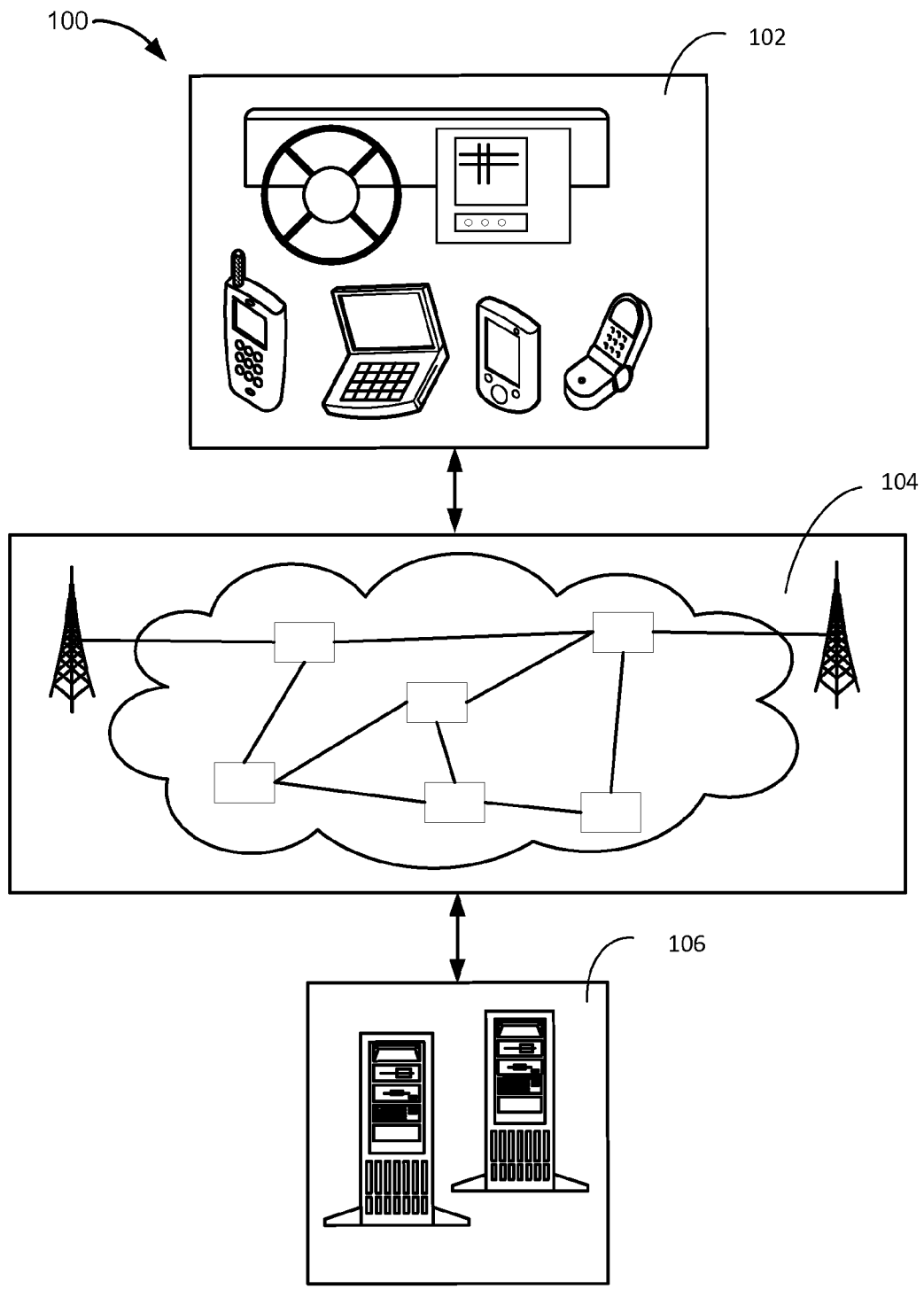
FIG. 1 is a navigation system with a combined navigation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Referring now to FIG. 1, therein is shown a navigation system 100 with a combined navigation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or a device incorporated with a vehicle, for example a car, a truck, a bus, a ship or a boat, a plane, a train, or a combination thereof. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, roadable aircraft, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
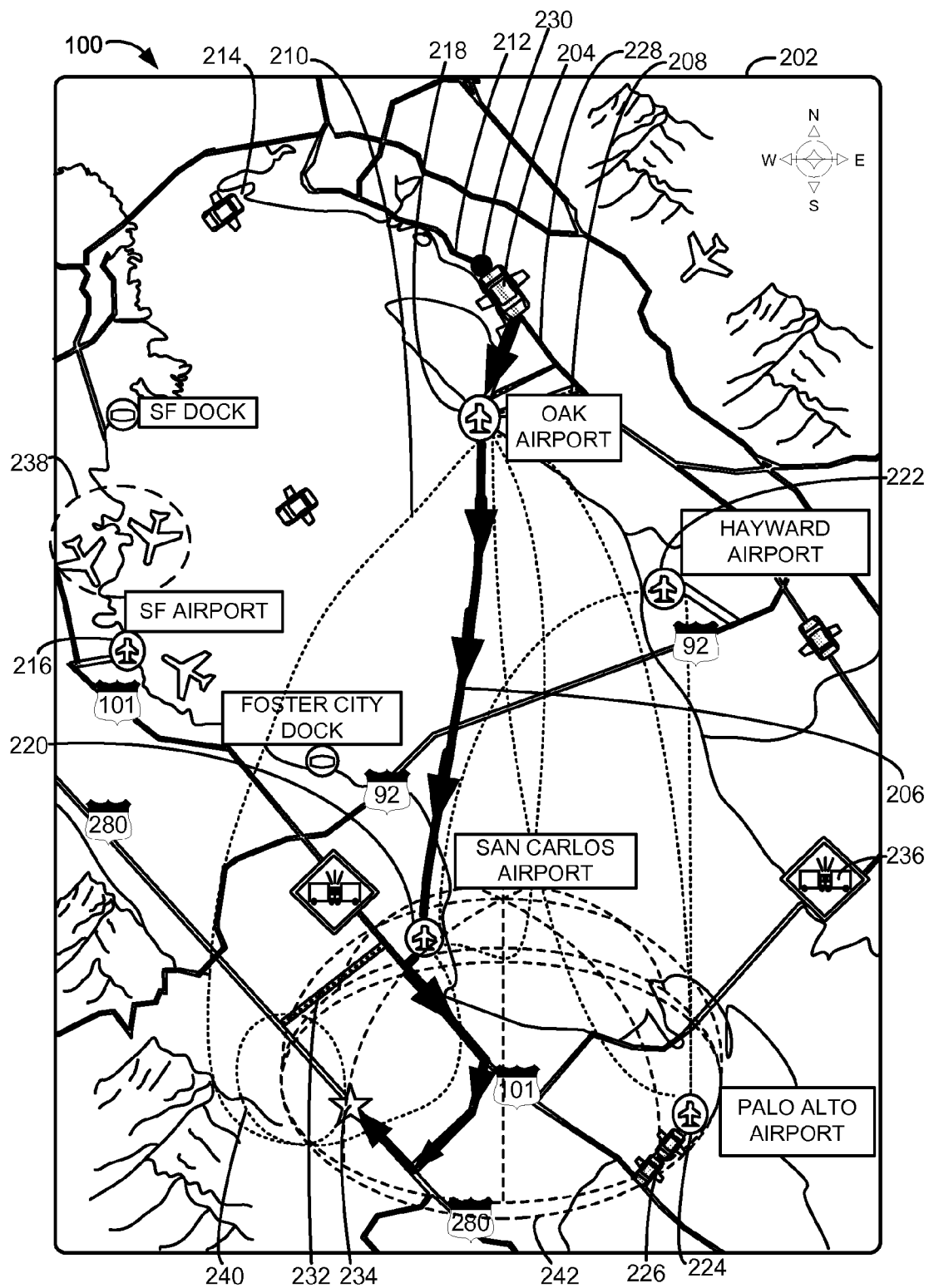
FIG. 2 is an example of a display on a display interface of the first device.

Referring now to FIG. 2 therein is shown an example of a display interface 202 of the first device 102 of FIG. 1. The display interface 202 can depict a map graphic showing a multimodal vehicle 204 traversing a composite navigation route 206.

The multimodal vehicle 204 is a mode of transportation configured to traverse multiple types of paths corresponding to multiple types of mediums. For example, the multimodal vehicle 204 can include a roadable aircraft, an amphibious vehicle, a personal air vehicle, an aerial cycle, a vertical take-off and landing (VTOL) aircraft, a sea-plane, or a combination thereof.

The composite navigation route 206 is a guidance path generated by the navigation system 100 for continuously guiding a user or a mode of transportation over multiple types of paths corresponding to multiple types of mediums. The composite navigation route 206 can include a ground navigation route 208 and a non-terrestrial navigation route 210.

The ground navigation route 208 is a guidance path generated by the navigation system 100 for guiding a user or a mode of transportation directly travelling on the ground. The ground navigation route 208 can be used to guide a mode of transportation over a ground travel segment 212.

For example, the ground navigation route 208 can be used to guide the multimodal vehicle 204 over the ground travel segment 212. The ground travel segment 212 is a portion of a journey or trip over roadways or passage infrastructure. The ground navigation route 208 can be for guiding the multimodal vehicle 204 directly contacting or within close proximity of the ground, as predetermined by the navigation system 100, while traversing the ground travel segment 212.

For example, the ground travel segment 212 can include roads, streets, highways, thoroughfares, intersections, crossings, bridges, tunnels, or a combination thereof. As a more specific example, the ground travel segment 212 can include streets, freeways, motorways, expressways, turnpikes, toll roads, arterial roads, collector roads, frontage roads, or a combination thereof.

The non-terrestrial navigation route 210 is a guidance path generated by the navigation system 100 for guiding a user or a mode of transportation on or through a non-terrestrial medium. The non-terrestrial navigation route 210 can be used to guide a user or a mode of transportation travelling on or through a non-terrestrial travel segment 214. For example, the non-terrestrial navigation route 210 can be used to guide the multimodal vehicle 204 over the non-terrestrial travel segment 214.

The non-terrestrial travel segment 214 is a portion of a journey or trip over airways, waterways, or a combination thereof. As a more specific example, the non-terrestrial travel segment 214 can include a flight path, a nautical route, an under-water route, or a combination thereof. The non-terrestrial navigation route 210 can be for guiding the multimodal vehicle 204 directly contacting or traversing through water, air, or a combination thereof without contacting or above the ground.

The composite navigation route 206 can also pass through or include a mode-transition point 216. The mode-transition point 216 is a structure or geographic area for facilitating a transition from the ground travel segment 212 to the non-terrestrial travel segment 214, the non-terrestrial travel segment 214 to the ground travel segment 212, or a combination thereof. For example, the mode-transition point 216 can include an airport, an airway, a landing strip, a take-off point, a launch point, a dock, a pier, a wharf, a seaport, or a combination thereof.

The mode-transition point 216 can include a departure point 218, an arrival point 220, or a combination thereof. The departure point 218 is an instance of the mode-transition point 216 for facilitating a transition from a first travel mode to a second travel mode. For example, the departure point 218 can be for transitioning from the ground travel segment 212 to the non-terrestrial travel segment 214. Also for example, the departure point 218 can include a departure airport, a departure dock, or a combination thereof.

The arrival point 220 is an instance of the mode-transition point 216 for facilitating a transition from the second travel mode back to the first travel mode. For example, the arrival point 220 can be for transitioning from the non-terrestrial travel segment 214 to the ground travel segment 212. Also for example, the arrival point 220 can include an arrival airport, an arrival dock, or a combination thereof.

The display interface 202 can also depict instances of a departure candidate point 222 and an arrival candidate point 224. The departure candidate point 222 is an instance of the mode-transition point 216 for potentially facilitating a transition from the first travel mode to the second travel mode. More specifically, the departure candidate point 222 can be an instance of the mode-transition point 216 for potentially facilitating the transition from the ground travel segment 212 to the non-terrestrial travel segment 214. For example, the navigation system 100 can select the departure point 218 from among multiple instances of the departure candidate point 222. As an additional example, the departure candidate point 222 can represent any one of several departure airports in a geographic locale.

The arrival candidate point 224 is an instance of the mode-transition point 216 for potentially facilitating a transition from the second travel mode back to the first travel mode. More specifically, the arrival candidate point 224 can be an instance of the mode-transition point 216 for potentially facilitating the transition from the non-terrestrial travel segment 214 to the ground travel segment 212. For example, the navigation system 100 can select the arrival point 220 from among multiple instances of the arrival candidate point 224. As an additional example, the arrival candidate point 224 can represent one of several arrival airports in a geographic locale.

The display interface 202 can also depict a vehicle queue 226 at the departure point 218, the arrival point 220, or a combination thereof. The vehicle queue 226 is the number of vehicles, aircrafts, watercrafts, or other instances of the multimodal vehicle 204 waiting to utilize the mode-transition point 216. For example, the vehicle queue 226 can be the number of roadable aircrafts, airplanes, or a combination thereof waiting to utilize a facility of an airport such as a runway or landing strip.

The ground navigation route 208 can include a departure ground route 228, an arrival ground route 232, or a combination thereof. The departure ground route 228 is a portion of the ground navigation route 208 for guiding a mode of transportation from a designated physical location, such as a current location 230 or a user-designated location, to the departure point 218. The current location 230 is a real-time geographic position or coordinate of a device in the navigation system 100. For example, the current location 230 can be a real-time geographic position or coordinate of the first device 102.

The arrival ground route 232 is a portion of the ground navigation route 208 for guiding a mode of transportation from the arrival point 220 to a destination 234. The destination 234 is a geographic location or coordinate intended as a final stopping point of the composite navigation route 206. For example, the destination 234 can represent a residence, a workplace, a meeting place, or a combination thereof.

The display interface 202 can also depict a road traffic condition 236, a non-terrestrial traffic condition 238, or a combination thereof. The road traffic condition 236 is information concerning a movement of vehicles or other modes of transportation along a roadway or passage infrastructure. For example, the road traffic condition 236 can include information concerning road closures, accidents, traffic pace, or a combination thereof.

The non-terrestrial traffic condition 238 is information concerning a movement of aircrafts, ships, or other modes of transportation along an airway, a nautical route, or a combination thereof. For example, the non-terrestrial traffic condition 238 can include information concerning re-routes, takeoff delays, approach delays, runway closures, dock closures, or a combination thereof. The non-terrestrial traffic condition 238 can also include information concerning a holding pattern 240.

The holding pattern 240 is a delay maneuver undertaken by a mode of transportation for approaching the mode-transition point 216. For example, the arrival point 220 can require the multimodal vehicle 204 to execute the holding pattern 240 before landing at a runway of the arrival point 220. As an additional example, the arrival point 220 can require the multimodal vehicle 204 to execute the holding pattern 240 due to adverse weather conditions.

The display interface 202 can also depict a geo-dome 242 surrounding the destination 234. The geo-dome 242 is a virtual perimeter circumscribing a representation of a geographic area or location in the real world. For example, the geo-dome 242 can be in the shape of a spherical cap, a hemisphere, a spherical dome, or a combination thereof. The geo-dome 242 can include a three-dimensional space surrounding the geographic area or location. The geo-dome 242 will be discussed in detail in the sections below.

Figure 3:
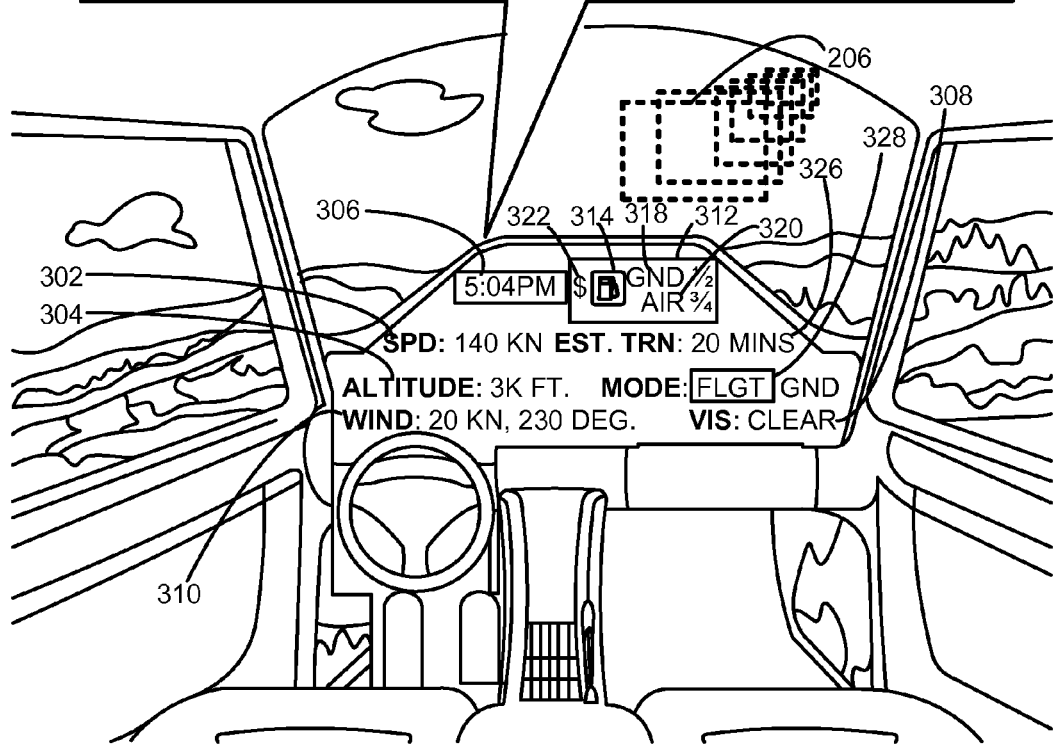
FIG. 3 is an example of another display on the display interface of the first device.

Referring now to FIG. 3 there is shown another example display on the display interface 202 of the first device 102 of FIG. 1. The display interface 202 can depict a speed 302, an altitude 304, or a combination thereof of the first device 102. The speed 302 can represent a rate of change of the first device 102. The altitude 304 can represent a height above sea level of the first device 102.

The display interface 202 can also depict a navigation context 306, a safety condition 308, or a combination thereof. The navigation context 306 can represent a temporal context, a geographic context, or a combination thereof. For example, the temporal context can include a time-of-day, a day-of-the-week, a month, a season, or a combination thereof. The geographic context can include a municipality such as a city or unincorporated region, a county, a state, a geographic region, or a combination thereof.

The safety condition 308 represents information or data concerning hazards or heightened levels of risk brought on by environmental or administrative factors. For example, the navigation system 100 can determine the safety condition 308 based on a meteorological condition 310, a safety record, or a combination thereof. The meteorological condition 310 represents information or data concerning an atmospheric or weather-related phenomenon or occurrence at a geographic location. For example, the meteorological condition 310 can be a visibility level, a cloud clearance level, a cloud ceiling level, a sea level, a tidal level, or a combination thereof.

The display interface 202 can also depict a resource constraint 312. The resource constraint 312 is information or data concerning a limitation or scarcity concerning a tangible or intangible asset. The resource constraint 312 can include a fuel constraint 314, a time constraint 316, or a combination thereof. The fuel constraint 314 can further include a ground fuel level 318, a non-terrestrial fuel level 320, a fuel cost 322, or a combination thereof. The ground fuel level 318 can represent an amount of natural resources detected in a vehicle or mode of transportation for traversing the ground travel segment 212. For example, the ground fuel level 318 can represent an amount of petroleum-based fuel, organic fuel, or a combination thereof. As a more specific example, the ground fuel level 318 can represent an amount of gasoline or diesel fuel.

The non-terrestrial fuel level 320 can represent an amount of natural resources detected in a mode of transportation for traversing the non-terrestrial travel segment 214. For example, the non-terrestrial fuel level can represent an amount of aviation fuel, jet fuel, or a combination thereof.

The fuel cost 322 can represent a cost of a ground fuel, a non-terrestrial fuel, or a combination thereof. The time constraint 316 can include a scheduled meeting time, a period of availability, a temporal deadline, or a combination thereof. As will be discussed in the sections below, the navigation system 100 can generate the composite navigation route 206 based on the resource constraint 312 including the fuel constraint 314, the time constraint 316, or a combination thereof.

The display interface 202 can depict a total travel time 330. The total travel time 330 is a total amount of time determined by the navigation system 100 for traversing the composite navigation route 206 of FIG. 2.

The display interface 202 can also depict an estimated transition time 326. The estimated transition time 326 is a projected amount of time required for the multimodal vehicle 204 to transition from either the ground travel segment 212 of FIG. 2 to the non-terrestrial travel segment 214 of FIG. 2 or the non-terrestrial travel segment 214 to the ground travel segment 212. The estimated transition time 326 can include a taxiing time, a landing time, a takeoff time, or a combination thereof.

The display interface 202 can depict a mode capability 328. The mode capability 328 is a functional ability of the multimodal vehicle 204 pertaining to transportation or conveyance. The mode capability 328 can include a driving capability, a flight capability, a sailing or nautical capability, a submersible capability, or a combination thereof.

The display interface 202 can also depict a facility capacity 324. The facility capacity 324 is information concerning an availability or a serviceability of the mode-transition point 216. For example, when the mode-transition point 216 is an airport, the facility capacity 324 can refer to an infrastructural availability, including the number of runways, at the airport, a staffing level, or a combination thereof. As an additional example, when the mode-transition point 216 is a dock, the facility capacity 324 can refer to the number of longshoremen at the dock. As a more specific example, the facility capacity 324 can further represent or be associated with average wait times or delay based on the infrastructural availability, a staffing level, or a combination thereof.

For illustrative purposes, the navigation system 100 is described as calculating routes and guiding a user or the multimodal vehicle 204 corresponding to the roadable aircraft. However, it is understood that the navigation system 100 can perform the described processes for other types of vehicles, such as amphibious vehicles, hovercrafts, submersible vehicle, or a combination thereof.

Figure 4:
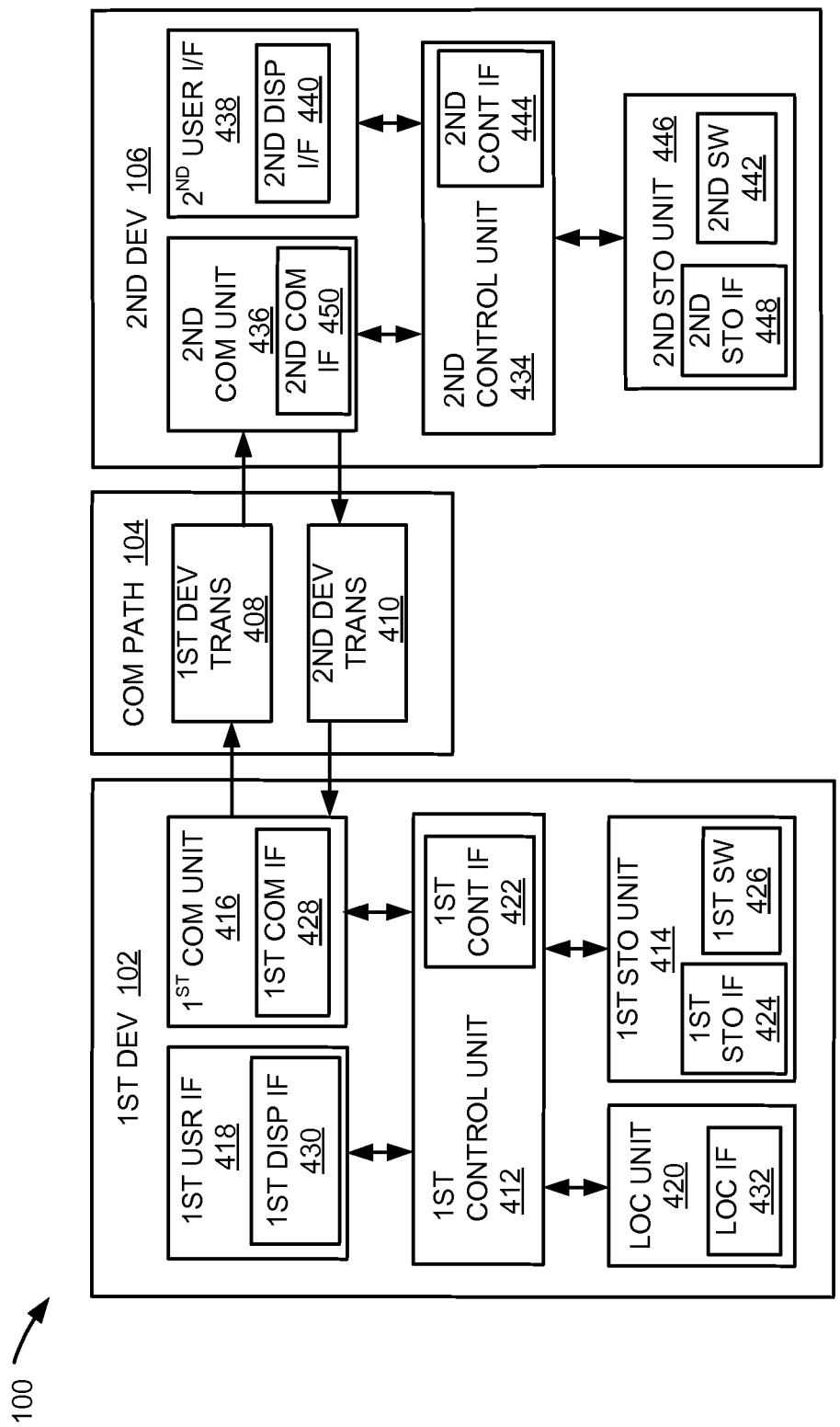
FIG. 4 is an exemplary block diagram of the navigation system.

Referring now to FIG. 4 therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate a location or movement information, including a geographic position, a heading, an inertial orientation, a speed, an altitude, or a combination thereof or a change therein of the first device 1002. The location unit 420 can be implemented in many ways.

For example, the location unit 420 can function as at least a part of a global positioning system (GPS), a global navigation satellite system (GLONASS), an inertial navigation system, a cellular-tower location system, a pressure location system, or any combination thereof. The location unit 220 can include an accelerometer, a gyroscope, an airspeed indicator, a compass, a heading indicator, an altimeter, an automatic dependent surveillance-broadcast (ADS-B) transponder, or a combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, point of interest (POI), navigation routing entries, reviews/ratings, feedback, traffic patterns, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POIs), navigation routing entries, reviews/ratings, feedback, traffic patterns, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
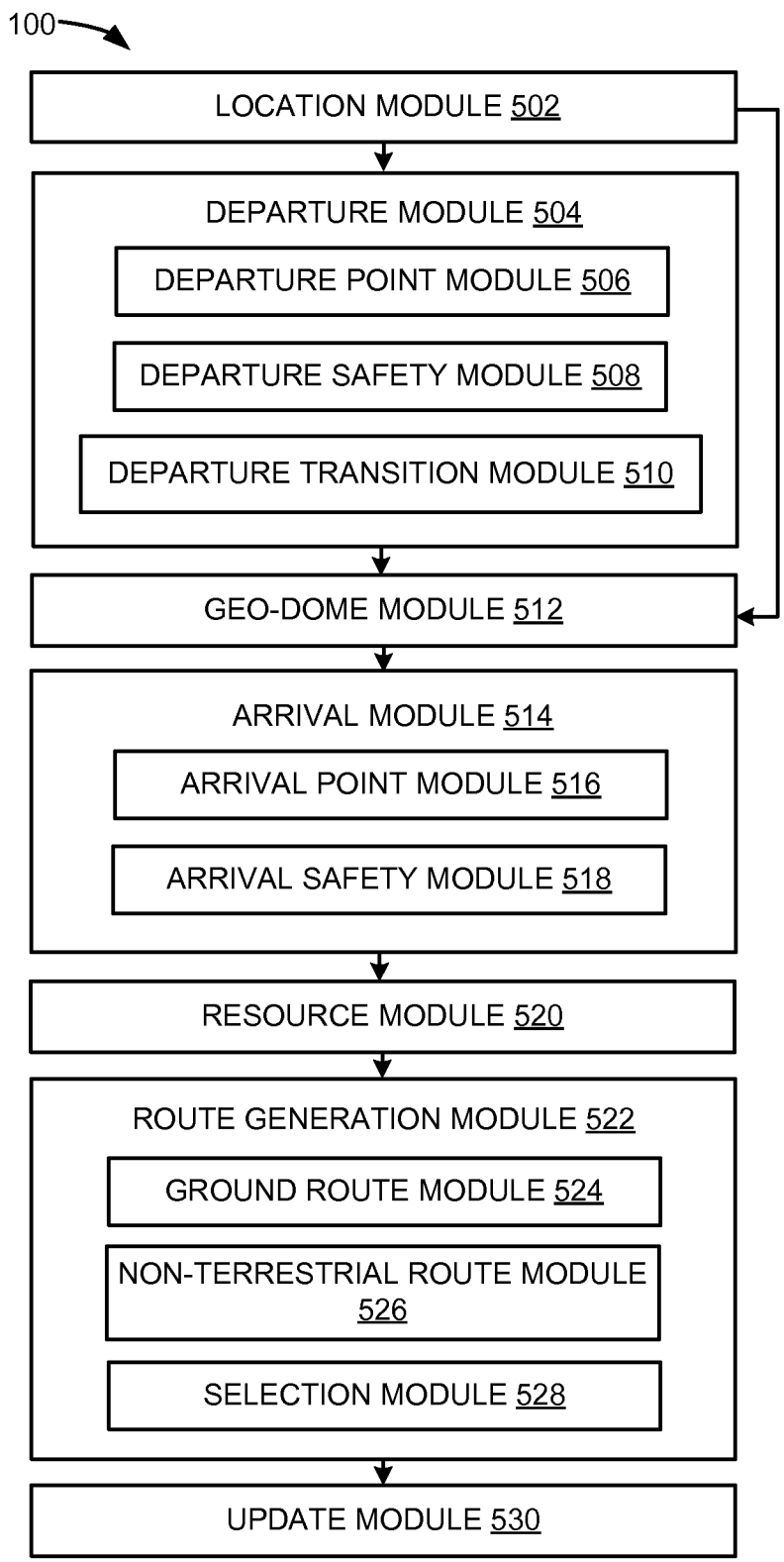
FIG. 5 is a control flow of the navigation system.

Referring now to FIG. 5, therein is shown a control flow of the navigation system 100 with a combined navigation mechanism. The navigation system 100 can include a location module 502, a departure module 504, a geo-dome module 512, an arrival module 514, a resource module 520, a route generation module 522, an update module 530, or a combination thereof.

The modules can be coupled by having the input of one module connected to the output of another module as shown in FIG. 5. The modules can be coupled by using wired or wireless connections, the network 104 of FIG. 1, instructional steps, or a combination thereof. The modules can be coupled directly, without any intervening structures other than the structure providing the direction connection. The modules can further be coupled indirectly, through a shared connection or other functional structures between the coupled modules.

The location module 502 is configured to determine a geographical or movement information of the first device 102 of FIG. 1. The location module 502 can determine the current location 230 of FIG. 2, calculate the speed 302 of FIG. 3, or a combination thereof for the first device 102. The location module 502 can determine the current location 230 of the first device 102 and calculate the speed 302 of the first device 102 for determining whether the multimodal vehicle 204 of FIG. 2 is traversing the ground travel segment 212 of FIG. 2 or the non-terrestrial travel segment 214 of FIG. 2.

The location module 502 can use the location unit 420 of FIG. 4, the first communication unit 416 of FIG. 4, the second communication unit 436 of FIG. 4, or a combination thereof to determine the current location 230. The current location 230 can include a real-time geospatial position of the first device 102 including the altitude 304 of FIG. 3 of the first device 102.

For example, the location module 502 can determine the current location 230 by using a GPS component of the location unit 420 to determine the geographic coordinates of the first device 102. As an additional example, the location module 502 can determine the current location 230 by using the ADS-B transponder to determine the geospatial position and the altitude 304 of the first device 102. As yet another example, the location module 502 can determine the current location 230 by using the first communication unit 416 to determine the current location 230 through a multilateration (MLAT) technique, a triangulation technique, or a combination thereof.

In addition, the location module 502 can receive the current location 230 from the user of the navigation system 100, another device in the navigation system 100, a device outside of the navigation system 100, or a combination thereof. For example, the location module 502 can receive the current location 230 from a Federal Aviation Administration (FAA) data feed, an Aircraft Situation Display to Industry (ASDI) data feed, an airport data feed, or a combination thereof.

The location module 502 can also use the location unit 420 to calculate the speed 302. For example, the location module 502 can use the GPS component, the accelerometer component, or a combination thereof of the location unit 420 to calculate the speed 302 of the first device 102.

The location module 502 can determine whether the multimodal vehicle 204 is traversing the ground travel segment 212 or the non-terrestrial travel segment 214 based on the current location 230, the speed 302, or a combination thereof. The location module 502 can determine whether the multimodal vehicle 204 is traversing the non-terrestrial travel segment 214 by comparing the current location 230 with coordinates from a map database, a satellite database, or a combination thereof.

For example, the location module 502 can determine the multimodal vehicle 204 is traversing the non-terrestrial travel segment 214 when the current location 230 indicates the first device 102 is located over a body of water such as an ocean, a lake, or a river. As an additional example, the location module 502 can determine the multimodal vehicle 204 is traversing the non-terrestrial travel segment 214 when the current location 230 indicates the altitude 304 of the first device 102 is above a maximum threshold elevation reachable by a ground route predetermined by the navigation system 100. Moreover, the location module 502 can determine the multimodal vehicle 204 is traversing the non-terrestrial travel segment 214 when the speed 302 of the first device 102 is indicative of an airspeed or exceeds a threshold speed predetermined by the navigation system 100 for the current location 230.

The location module 502 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to determine the current location 230 and calculate the speed 302.

Moreover, the location module 502 can also communicate the current location 230 and the speed 302 between devices through the first communication unit 416, the second communication unit 436, or a combination thereof. After determining the current location 230 and calculating the speed 302, the control flow can pass from the location module 502 to the departure module 504 when the current location 230 of the multimodal vehicle 204 is determined to be traversing the ground travel segment 212. Alternatively, the control flow can pass from the location module 502 directly to the geo-dome module 512 when the current location 230 of the multimodal vehicle 204 is determined to be traversing the non-terrestrial travel segment 214.

The departure module 504 is configured to locate one or more instances of a departure candidate point 222 of FIG. 2 and determine a safety situation or wait time at the departure candidate point 222. The departure module 504 can include a departure point module 506, a departure safety module 508, a departure transition module 510, or a combination thereof.

The departure point module 506 is configured to locate instances of the departure candidate point 222. The departure point module 506 can locate instances of the departure candidate point 222 by conducting a proximity search. The proximity search can involve searching for one or more instances of the departure candidate point 222 within a distance radius of the starting location, such as the current location 230 or the user-generated location. The departure point module 506 can increase or decrease the distance radius of the proximity search based on the navigation context 306 of FIG. 3 including the temporal context such as the time-of-day or the day-of-the-week, the geographic context such as the current city, county, or state, or a combination thereof.

The departure point module 506 can conduct the proximity search by accessing a POI database, a Geographic Information System (GIS) database, a Global Navigation Satellite System (GNSS) database, a map database management system, a Global Positioning System (GPS) database, a user-generated database, or a combination thereof. The departure point module 506 can include or exclude instances of the departure candidate point 222 based on the mode capability 328 of FIG. 3 of the multimodal vehicle 204.

For example, the departure point module 506 can exclude all maritime instances of the mode-transition point 216 such as docks or shorelines when the multimodal vehicle 204 does not have an amphibious capability. As an additional example, the departure point module 506 can exclude all aerial instances of the mode-transition point 216 such as airports or helipads when the multimodal vehicle 204 does not have an air-to-ground capability.

The departure point module 506 can determine the mode capability 328 of the multimodal vehicle 204 by querying an engine control unit of the multimodal vehicle 204. In addition, the mode capability 328 of the multimodal vehicle 204 can be predetermined by the navigation system 100. Moreover, the departure point module 506 can determine the mode capability 328 of the multimodal vehicle 204 based on a user input.

The departure safety module 508 is configured to determine the safety condition 308 of FIG. 3 at one or more instances of the departure candidate point 222. The departure safety module 508 can determine the safety condition 308 at one or more instances of the departure candidate point 222 based on the navigation context 306 including the time-of-day, the meteorological condition 310 of FIG. 3, a safety track record, or a combination thereof.

The departure safety module 508 can determine the safety condition 308 by comparing the meteorological condition 310 at each instance of the departure candidate point 222 with threshold minimums proposed by a regulatory body such as the FAA for the navigation context 306 representing the time-of-day. For example, the departure safety module 508 can determine the safety condition 308 by comparing a visibility level, a cloud ceiling, a cloud clearance, or a combination thereof at each instance of the departure candidate point 222 with FAA Visual Flight Rules (VFR) weather minimums for the time-of-day. The departure safety module 508 can exclude an instance of the departure candidate point 222 from consideration when the meteorological condition 310 at that instance of the departure candidate point 222 does not meet or exceed the VFR weather minimums for the time-of-day.

In addition, the departure safety module 508 can compare the meteorological condition 310 at each instance of the departure candidate point 222 with the meteorological condition 310 at other instances of the departure candidate point 222. For example, the departure safety module 508 can rank multiple instances of the departure candidate point 222 based on the current instance of the meteorological condition 310 such as the visibility level, the cloud ceiling, a cloud clearance, or a combination thereof.

The departure safety module 508 can also determine the safety condition 308 by accessing the safety track record of each instance of the departure candidate point 222. For example, the departure safety module 508 can retrieve information from a National Transportation Safety Board (NTSB) database including an NTSB Aviation Database. Moreover, the departure safety module 508 can also determine the safety track record of each instance of the departure candidate point 222 by accessing a municipal safety database.

The departure transition module 510 is configured to calculate the estimated transition time 326 of FIG. 3 from the ground travel segment 212 to the non-terrestrial travel segment 214. The departure transition module 510 can calculate the estimated transition time 326 from the ground travel segment 212 to the non-terrestrial travel segment 214 based on the vehicle queue 226 of FIG. 2, the facility capacity 324 of FIG. 3, the safety condition 308, or a combination thereof at one or more instances of the departure candidate point 222.

As previously discussed, the estimated transition time 326 can refer to a projected amount of time required for the multimodal vehicle 204 to transition from the ground travel segment 212 to the non-terrestrial travel segment 214 upon arriving at the departure candidate point 222. For example, when the departure candidate point 222 is an airport, the estimated transition time 326 can include a taxiing time, a takeoff time, or a combination thereof. As an additional example, when the departure candidate point 222 is a dock, the estimated transition time 326 can include an unmooring time, a launch time, or a combination thereof.

The departure transition module 510 can calculate the estimated transition time 326 by first determining the vehicle queue 226 at one or more instances of the departure candidate point 222. As previously discussed, the vehicle queue 226 can be the number of other instances of the multimodal vehicle 204, the number of aircrafts, the number of watercrafts, or a combination thereof presently waiting to utilize the departure candidate point 222. For example, when the departure candidate point 222 is an airport, the vehicle queue can refer to the number of airplanes, roadable aircrafts, or a combination thereof waiting to utilize a runway of the airport.

The departure transition module 510 can determine the vehicle queue 226 by estimating the number of other instances of the multimodal vehicle 204, aircrafts, or watercrafts waiting to utilize one or more instances of the departure candidate point 222 based on the navigation context 306 including the temporal context. In addition, the departure transition module 510 can determine the vehicle queue 226 by analyzing a historical usage pattern at one or more instances of the departure candidate point 222.

Moreover, the departure transition module 510 can determine the vehicle queue 226 by communicating with a device or system at the departure candidate point 222 such as a scheduling server, an air traffic control system, or a combination thereof. Additionally, the departure transition module 510 can determine the vehicle queue 226 by retrieving information from a FAA data feed, an airport data feed, or a combination thereof.

Once the departure transition module 510 has determined the vehicle queue 226, the departure transition module 510 can calculate the estimated transition time 326 by taking into account the facility capacity 324, the safety condition 308, the meteorological condition 310, or a combination thereof at one or more instances of the departure candidate point 222. As previously discussed, the facility capacity 324 can include a staff level or infrastructure capacity at one or more instances of the departure candidate point 222. For example, the facility capacity 324 can include the number of runways at an airport, the number of air-traffic or ship-traffic controllers on duty, or a combination thereof.

The departure transition module 510 can calculate the estimated transition time 326 by dividing the vehicle queue 226 by the number of available runways or docks. In addition, the departure transition module 510 can calculate the estimated transition time 326 by dividing the vehicle queue 226 by the number of available air-traffic or ship-traffic controllers on duty to obtain an adjusted instance of the vehicle queue 226. The departure transition module 510 can then calculate the estimated transition time 326 by multiplying the adjusted instance of the vehicle queue 226 by an average time between takeoffs or launches.

The departure transition module 510 can also adjust the estimated transition time 326 based on the safety condition 308, the meteorological condition 310, or a combination thereof. For example, the departure transition module 510 can increase the average time between takeoffs due to an inclement instance of the meteorological condition 310 such as poor visibility or cloud clearance.

The departure transition module 510 can also calculate the estimated transition time 326 based on previous departures from the departure candidate point 222. For example, one instance of the departure candidate point 222 can be a municipal airport and the departure transition module 510 can calculate the estimated transition time 326 based on an average amount of time it took the multimodal vehicle 204 to take off from the municipal airport in all previous departures.

The departure module 504 can be part of the first software 426, the second software 442, or a combination thereof. The first control unit 412 can execute the first software 426, the second control unit 434 can execute the second software 442, or a combination thereof to locate instances of the departure candidate point 222, determine the safety condition 308 at each instance of the departure candidate point 222, calculate the estimated transition time 326 at each instance of the departure candidate point 222, or a combination thereof.

Moreover, the departure module 504 can also communicate instances of the departure candidate point 222, the safety condition 308 at each instance of the departure candidate point 222, the estimated transition time 326 at each instance of the departure candidate point 222, or a combination thereof between devices through the first communication unit 416, the second communication unit 436, or a combination thereof. After locating instances of the departure candidate point 222, determining the safety condition 308 at each instance of the departure candidate point 222, calculating the estimated transition time 326 at each instance of the departure candidate point 222, or a combination thereof the control flow can pass from the departure module 504 to the geo-dome module 512.

The geo-dome module 512 is configured to generate the geo-dome 242 of FIG. 2 to include the destination 234 of FIG. 2. The geo-dome module 512 can generate the geo-dome 242 around the destination 234 for indicating a proximity to the destination 234. As discussed previously, the geo-dome 242 can be a virtual perimeter surrounding a geographic area or location in the real world. The geometric shape of the geo-dome 242 can be a spherical cap, a hemisphere, a spherical dome, or a combination thereof.

The geo-dome module 512 can generate the geo-dome 242 with the center of the geo-dome 242 as the destination 234. In addition, the geo-dome module 512 can generate the geo-dome 242 with the center of the geo-dome 242 as a geographic location separate from the destination 234 but encompassing the destination 234 within the radius of the geo-dome 242. The geo-dome module 512 can generate the geo-dome 242 to include ground terrain such as land, roads, ground-based pathways, or a combination thereof. The geo-dome module 512 can also generate the geo-dome 242 to include waterways, airspace above the ground terrain, airspace above the waterways, or a combination thereof.

For example, the geo-dome module 512 can generate the geo-dome 242 as a virtual perimeter in the shape of a spherical dome with a radius of 10 kilometers and the center point of the geo-dome 242 as the destination 234. The geo-dome module 512 can determine all POIs, access points, intersections, instances of the arrival candidate point 224, or a combination thereof within the 10 kilometers radius of the geo-dome 242.

The geo-dome module 512 can also detect when the multimodal vehicle 204 has entered or exited the geo-dome 242. The geo-dome module 512 can detect when the multimodal vehicle 204 has entered or exited the geo-dome 242 by comparing the current location 230 of the first device 102 with a boundary of the geo-dome 242. For example, the multimodal vehicle 204 can be a roadable aircraft entering the geo-dome 242 as part of the non-terrestrial travel segment 214 of FIG. 2. The geo-dome module 512 can detect when the multimodal vehicle 204 has entered the geo-dome 242 by comparing the current location 230 of the first device 102 carried by the multimodal vehicle 204 with the boundary of the geo-dome 242.

The geo-dome module 512 can be part of the first software 426, the second software 442, or a combination thereof. The first control unit 412 can execute the first software 426, the second control unit 434 can execute the second software 442, or a combination thereof to generate the geo-dome 242.

Moreover, the geo-dome module 512 can also communicate the geo-dome 242 between devices through the first communication unit 416, the second communication unit 436, or a combination thereof. After generating the geo-dome 242, the control flow can pass from the geo-dome module 512 to the arrival module 514.

The arrival module 514 is configured to locate one or more instances of an arrival candidate point 224 of FIG. 2 and determine a safety situation at the arrival candidate point 224. The arrival module 514 can include an arrival point module 518, an arrival safety module 518, or a combination thereof.

The arrival point module 518 is configured to locate instances of the arrival candidate point 224. The arrival point module 518 can locate instances of the arrival candidate point 224 by conducting a search for all instances of the arrival candidate point 224 within the geo-dome 242. The arrival point module 518 can interact with the geo-dome module 512 to increase or decrease the radius of the geo-dome 242 based on the navigation context 306 such as the time-of-day, the day-of-the-week, the geographic context, or a combination thereof.

The arrival point module 518 can conduct the search by accessing the POI database, the GIS database, the GNSS database, the map database management system, the GPS database, the user-generated database, or a combination thereof. The arrival point module 518 can also include or exclude instances of the arrival candidate point 224 based on the mode capability 328 of the multimodal vehicle 204.

The arrival point module 518 can also determine one instance of the mode-transition point 216 as both an instance of the arrival candidate point 224 and an instance of the departure candidate point 222 based on the radius of the geo-dome 242 generated by the geo-dome module 512 and the radius of the proximity search conducted by the departure point module 506. For example, the starting location and the destination 234 can be separated by a straight-line distance or a great-circle distance of 30 kilometers. In this example, the arrival point module 518 can determine one instance of the mode-transition point 216 as both the arrival candidate point 224 and the departure candidate point 222 when the combined radii of the geo-dome 242 and the proximity search conducted by the departure point module 506 exceed 30 kilometers.

As a more specific example, the starting location and the destination 234 can be separated by the straight-line distance or the great-circle distance of 30 kilometers. In this example, the departure point module 506 can determine one instance of the mode-transition point 216 as the departure candidate point 222 when the mode-transition point 216 is located within the proximity search of 20 kilometers of the starting location. In addition, the arrival point module 518 can determine the same instance of the mode-transition point 216 as the arrival candidate point 224 when the same instance of the mode-transition point 216 is located within the radius of the geo-dome 242 of 15 kilometers.

The arrival safety module 518 is also configured to determine the safety condition 308 at one or more instances of the arrival candidate point 224. The arrival safety module 518 can determine the safety condition 308 at one or more instances of the arrival candidate point 224 based on the navigation context 306 including the time-of-day, the meteorological condition 310, the safety track record of the arrival candidate point 224, or a combination thereof.

The arrival safety module 518 can determine the safety condition 308 by comparing the meteorological condition 310 at each instance of the arrival candidate point 224 with threshold minimums proposed by the FAA for the navigation context 306 representing the time-of-day. For example, the arrival safety module 518 can determine safety condition 308 by comparing the visibility level, the cloud ceiling, the cloud clearance, or a combination thereof at each instance of the arrival candidate point 224 with FAA VFR weather minimums for the time-of-day.

The arrival safety module 518 can also determine the safety condition 308 by determining the meteorological condition 310 at an estimated arrival time. For example, the arrival safety module 518 can retrieve a weather forecast from a National Weather Service database, a National Oceanic and Atmospheric Administration database, or a combination thereof.

The arrival safety module 518 can exclude an instance of the arrival candidate point 224 from consideration when the meteorological condition 310 at that instance of the arrival candidate point 224 is not forecast to meet or exceed the VFR weather minimums at the estimated arrival time. In addition, the arrival safety module 518 can compare forecasted instances of the meteorological condition 310 at each instance of the arrival candidate point 224 with forecasted instances of the meteorological condition 310 at other instances of the arrival candidate point 224. For example, the arrival safety module 518 can rank multiple instances of the arrival candidate point 224 based on the forecasted instances of the meteorological condition 310 such as the forecasted visibility level, cloud ceiling, cloud clearance, or a combination thereof.

The arrival safety module 518 can also determine the safety condition 308 by accessing the safety track record of each instance of the arrival candidate point 224. For example, the arrival safety module 518 can retrieve information from an NTSB database concerning the safety track record of each instance of the arrival candidate point 224.

The arrival module 514 can be part of the first software 426, the second software 442, or a combination thereof. The first control unit 412 can execute the first software 426, the second control unit 434 can execute the second software 442, or a combination thereof to locate instances of the arrival candidate point 224, determine the safety condition 308 at each instance of the arrival candidate point 224, or a combination thereof.

Moreover, the arrival module 514 can also communicate instances of the arrival candidate point 224, the safety condition 308 at each instance of the arrival candidate point 224, or a combination thereof between devices through the first communication unit 416, the second communication unit 436, or a combination thereof. After locating instances of the arrival candidate point 224, determining the safety condition 308 at each instance of the arrival candidate point 224, or a combination thereof, the control flow can pass from the arrival module 514 to the resource module 520.

The resource module 520 is configured to determine the resource constraint 312 of FIG. 3 of the multimodal vehicle 204. The resource constraint 312 can include the fuel constraint 314 of FIG. 3, the time constraint 316 of FIG. 3, or a combination thereof. More specifically, the fuel constraint 314 can include current instances of the ground fuel level 318 of FIG. 3, the non-terrestrial fuel level 320, or a combination thereof. In addition, the fuel constraint 314 can also include the fuel cost 322 of FIG. 3 associated with a ground fuel, a non-terrestrial fuel, or a combination thereof.

The resource module 520 can determine the fuel constraint 314 including current instances of the ground fuel level 318, the non-terrestrial fuel level 320, or a combination thereof by querying an engine control unit of the multimodal vehicle 204. In addition, the resource module 520 can determine the fuel constraint 314 by calculating the current instances of the ground fuel level 318, the non-terrestrial fuel level 320, or a combination thereof based on a distance traveled over the ground travel segment 212, the non-terrestrial travel segment 214, or a combination thereof.

For example, the resource module 520 can determine the current instance of the non-terrestrial fuel level 320 based on the distance traveled over the non-terrestrial travel segment 214 since the last time the multimodal vehicle 204 stopped at a fueling station to refuel the non-terrestrial fuel. Moreover, the resource module 520 can determine the fuel constraint 314 based on a user input.

The resource module 520 can determine the fuel cost 322 by retrieving cost information from an Energy Information Administration (EIA) database, a Department of Transportation (DOT) database, or a combination thereof. In addition, the fuel cost 322 can be predetermined by the navigation system 100. Moreover, the resource module 520 can determine the fuel cost 322 based on a user input.

The resource module 520 can determine the time constraint 316 by accessing a calendar application, an itinerary application, or a time-keeping application of the first device 102, the second device 106, or a combination thereof. For example, the resource module 520 can determine the time constraint 316 by first determining the navigation context 306 including the time-of-day, the day-of-the-week, or a combination thereof and then accessing the calendar application to determine an upcoming start time for a meeting or scheduled activity.

The resource module 520 can be part of the first software 426, the second software 442, or a combination thereof. The first control unit 412 can execute the first software 426, the second control unit 434 can execute the second software 442, or a combination thereof to determine the resource constraint 312.

Moreover, the resource module 520 can also communicate the resource constraint 312 between devices through the first communication unit 416, the second communication unit 436, or a combination thereof. After determining the resource constraint 312, the control flow can pass from the resource module 520 to the route generation module 522.

The route generation module 522 is configured to generate the composite navigation route 206 of FIG. 2. The route generation module 522 can generate the composite navigation route 206 for continuously guiding the multimodal vehicle 204 over the non-terrestrial travel segment 214 and the ground travel segment 212. The route generation module 522 can include a ground route module 524, a non-terrestrial route module 526, a selection module 528, or a combination thereof.

The ground route module 524 is configured to calculate multiple instances of the ground navigation route 208 of FIG. 2 as candidate routes for guiding the active maneuvering of the multimodal vehicle 204 in traversing to the destination 234. The ground navigation route 208 can include multiple instances of the departure ground route 228 of FIG. 2, the arrival ground route 232 of FIG. 2, or a combination thereof as candidates for guiding the active maneuvering of the multimodal vehicle 204 in traversing to the destination 234.

For example, the ground route module 524 can calculate multiple instances of the departure ground route 228 based on the geographic locations or coordinates of the starting point, including the current location 230 or a user-generated location, and multiple instances of the departure candidate point 222. The ground route module 524 can calculate multiple instances of the departure ground route 228 for determining all possible ground or near-ground routes from the current location 230 to each instance of the departure candidate point 222.

In addition, the ground route module 524 can generate multiple instances of the arrival ground route 232 based on the geographic locations or coordinates of multiple instances of the arrival candidate point 224 and the destination 234. The ground route module 524 can calculate multiple instances of the arrival ground route 232 for determining all possible ground or near-ground routes from each instance of the arrival candidate point 224 to the destination 234.

For example, the ground route module 524 can calculate the multiple instances of the ground navigation route 208 including multiple instances of the departure ground route 228, the arrival ground route 232, or a combination thereof by using a tree traversal mechanism, a graph traversal mechanism, or a combination thereof. As a more specific example, the ground route module 524 can calculate the multiple instances of the ground navigation route 208 using a Dijkstra's algorithm, a Bellman-Ford algorithm, an A-star algorithm, a bidirectional algorithm, a Floyd-Warshall algorithm, an iterative deepening algorithm, a shortest path algorithm, or a combination thereof.

The ground route module 524 can also determine the road traffic condition 236 of FIG. 2 on the multiple instances of the departure ground route 228, the arrival ground route 232, or a combination thereof. The ground route module 524 can determine the road traffic condition 236 on the multiple instances of the departure ground route 228, the arrival ground route 232, or a combination thereof by accessing a real-time traffic information, a crowd-sourced traffic information, a traffic history, or a combination thereof.

Moreover, the ground route module 524 can determine the road traffic condition 236 based on historical traffic patterns. Additionally, the ground route module 524 can determine the road traffic condition 236 by receiving or retrieving information concerning road closures, road conditions, weather, or accidents from another device in the navigation system 100.

The ground route module 524 can then store the candidate instances of the ground navigation route 208 including candidate instances of the departure ground route 228, the arrival ground route 232, or a combination thereof in the first storage unit 414, the second storage unit 446, or a combination thereof. The ground route module 524 can also use the first user interface 418, the second user interface 438, or a combination thereof to communicate instances of the ground navigation route 208 to a user of the navigation system 100.

It has been discovered that selecting the ground navigation route 208 based on the non-terrestrial navigation route 210 provides for an improved and beneficial process of generating ground-based navigation instructions. As an example, the navigation system 100 can now take into consideration issues or factors affecting the generation of non-terrestrial navigation routes, such as cloud coverage or visibility levels, when planning and generating ground-based navigation routes to improve the accuracy of navigation estimates and routes.

The non-terrestrial route module 526 is configured to calculate multiple candidate instances of the non-terrestrial navigation route 210 of FIG. 2 as candidates for guiding the active maneuvering of the multimodal vehicle 204 or for actively navigating the multimodal vehicle 204 in traversing the non-terrestrial segment or medium to the destination 234. The non-terrestrial route module 526 can calculate multiple candidate instances of the non-terrestrial navigation route 210 based on the geographic locations or coordinates of multiple instances of the departure candidate point 222 and the arrival candidate point 224. The non-terrestrial route module 526 can calculate multiple instances of the non-terrestrial navigation route 210 for determining all possible non-terrestrial routes between instances of the departure candidate point 222 and instances of the arrival candidate point 224.

The non-terrestrial route module 526 can calculate multiple instances of the non-terrestrial navigation route 210 based on a National Aeronautics and Space Administration (NASA) Highway in the Sky (HITS) route database. As an additional example, the non-terrestrial route module 526 can calculate multiple instances of the non-terrestrial navigation route 210 based on aerial flight paths approved by an air traffic control system of the arrival candidate point 224.

As yet another example, the non-terrestrial route module 526 can calculate multiple instances of the non-terrestrial navigation route 210 based on information from an ASDI database. In addition, the non-terrestrial route module 526 can calculate the non-terrestrial navigation route 210 using a Kalman filtering algorithm, a dynamic navigation planning algorithm, a terrain-based route planning algorithm, or a combination thereof.

It has been discovered that calculating multiple instances of the ground navigation route 208, the non-terrestrial navigation route 210, or a combination thereof prior to generating the composite navigation route 206 provides for improved resource efficiency. As an example, the navigation system 100 can select different instances of the ground navigation route 208, the non-terrestrial navigation route 210, or a combination thereof when any of the road traffic condition 236, the safety condition 308, or a combination thereof changes as the user embarks on the composite navigation route 206.

The non-terrestrial route module 526 can also determine the non-terrestrial traffic condition 238 of FIG. 2 of the multiple instances of the non-terrestrial navigation route 210. The non-terrestrial route module 526 can determine the non-terrestrial traffic condition 238 based on the estimated transition time 326 from the non-terrestrial travel segment 214 to the ground travel segment 212, the holding pattern 240 of FIG. 2, the facility capacity 324, the safety condition 308, or a combination thereof at one or more instances of the arrival candidate point 224.

For example, the non-terrestrial route module 526 can determine the non-terrestrial traffic condition 238 by calculating the estimated transition time 326 from the non-terrestrial travel segment 214 to the ground travel segment 212 at the arrival candidate point 224 based on the number of ships, vehicles, or aircrafts waiting to land or dock at each instance of the arrival candidate point 224. As an additional example, the non-terrestrial route module 526 can estimate the number of ships, vehicles, or aircrafts waiting to land or dock at each instance of the arrival candidate point 224 based on the navigation context 306 including the time-of-day, the day-of-the-week, or a combination thereof. In addition, the non-terrestrial route module 526 can calculate the estimated transition time 326 by retrieving or receiving information from a real-time non-terrestrial traffic data feed, an ASDI data feed, an airport data feed, or a combination thereof.

The non-terrestrial route module 526 can determine the non-terrestrial traffic condition 238 by determining the holding pattern 240 at each instance of the arrival candidate point 224. The non-terrestrial route module 526 can determine the holding pattern 240 by retrieving or receiving the holding pattern 240 from an air traffic control system at the arrival candidate point 224, an FAA data feed, or a combination thereof. In addition, the non-terrestrial route module 526 can determine the holding pattern 240 by accessing a saved instance of the holding pattern 240 from the first storage unit 414, the second storage unit 446, or a combination thereof.

The non-terrestrial route module 526 can adjust the estimated transition time 326 based on the holding pattern 240. For example, the non-terrestrial route module 526 can increase the estimated transition time 326 when the holding pattern 240 increases in either length or holding time as the number of ships, vehicles, or aircrafts waiting to land or dock at the arrival candidate point 224 increases.

The non-terrestrial route module 526 can also determine the non-terrestrial traffic condition 238 based on the facility capacity 324. For example, the non-terrestrial route module 526 can increase the estimated transition time 326 at a particular instance the arrival candidate point 224 when the facility capacity 324 of the particular instance of the arrival candidate point 224 indicates only one approach runway available at a certain time-of-day.

As an additional example, the non-terrestrial route module 526 can decrease the estimated transition time 326 at a particular instance of the arrival candidate point 224 when the facility capacity 324 of the particular instance of the arrival candidate point 224 indicates a second approach runway has become available. The non-terrestrial route module 526 can determine the facility capacity 324 based on information received from an air traffic control system of the arrival candidate point 224. Moreover, the facility capacity 324 can be predetermined by the navigation system 100.

In addition, the non-terrestrial route module 526 can determine the non-terrestrial traffic condition 238 based on the safety condition 308, such as the meteorological condition 310 and the safety record. For example, the non-terrestrial route module 526 can increase a holding time or a holding leg of the holding pattern 240 when the meteorological condition 310 indicates adverse weather conditions at the arrival candidate point 224.

The non-terrestrial route module 526 can also determine the non-terrestrial traffic condition 238 based on previous trips or traversals over an instance of the non-terrestrial navigation route 210. For example, the non-terrestrial route module 526 can determine whether the holding pattern 240 at a particular instance of the arrival candidate point 224 will be increased or decreased based on previous landings at the particular instance of the arrival candidate point 224 at approximately the same time-of-day. As an additional example, the non-terrestrial route module 526 can calculate the estimated transition time 326 at a particular instance of the arrival candidate point 224 by averaging all previous landing times at the particular instance of the arrival candidate point 224.

The selection module 528 is configured to generate the composite navigation route 206. The selection module 528 can generate the composite navigation route 206 in a number of ways.

The selection module 528 can generate the composite navigation route 206 by first selecting the departure point 218 of FIG. 2, the arrival point 220 of FIG. 2, the ground navigation route 208, the non-terrestrial navigation route 210, or a combination thereof. The selection module 528 can select the departure point 218, the arrival point 220, the ground navigation route 208, the non-terrestrial navigation route 210, or a combination thereof based on the resource constraint 312, the navigation context 306, a user preference, or a combination thereof.

More specifically, the selection module 528 can select the departure point 218, the arrival point 220, the ground navigation route 208, the non-terrestrial navigation route 210, or a combination thereof by balancing or prioritizing the user preference concerning the safety condition 308 with the user preference concerning the resource constraint 312, such as the fuel constraint 314 or the time constraint 316. The selection module 528 can select to minimize resource consumption, such as for fuel, overall monetary cost, time, or a combination thereof. The selection module 528 can further select according to user's preference, context surrounding the trip, such as for dictating importance of certain factors over others, or a combination thereof.

For example, the user preference can be a preference of a user of the navigation system 100 to maximize the safety condition 308 at the departure point 218, the arrival point 220, or a combination thereof. Based on this user preference, the selection module 528 can select an instance of the departure candidate point 222, the arrival candidate point 224, or a combination thereof with the most favorable instance of the safety condition 308 including the meteorological condition 310.

In the above example, the selection module 528 can prioritize the user preference for the safety condition 308 over all other considerations including the fuel constraint 314 and the time constraint 316. More specifically, the navigation system 100 can communicate to the user to expend additional time and resources to replenish the ground fuel level 318 or the non-terrestrial fuel level 320 to maximize the safety condition 308.

Continuing with the above example, the selection module 528 can also prioritize the user preference for the safety condition 308 by selecting the navigation context 306 or instances of the departure ground route 228, the arrival ground route 232, the non-terrestrial navigation route 210, or a combination thereof for maximizing a safety of the user. For example, the selection module 528 can communicate to the user to embark on any of the departure ground route 228, the arrival ground route 232, the non-terrestrial navigation route 210, or a combination thereof at a different time-of-day or on a different day-of-the-week. As an additional example, the selection module 528 can select instances of the departure ground route 228 or the arrival ground route 232 to avoid highways or other high speed roadways.

As an additional example, the user preference can be a preference of the user of the navigation system 100 to abide by or maximize an effect or consideration for the resource constraint 312 such as the fuel constraint 314 or the time constraint 316. More specifically, the selection module 528 can select the departure point 218, the arrival point 220, the ground navigation route 208, the non-terrestrial navigation route 210, or a combination thereof to conserve or maximize the ground fuel level 318, the non-terrestrial fuel level 320, the fuel cost 322, or a combination thereof.

The selection module 528 can select instances of the departure ground route 228 or the arrival ground route 232 with the shortest road distance for maximizing the ground fuel level 318. Moreover, the selection module 528 can also select an instance of the non-terrestrial navigation route 210 with the shortest flight or nautical distance for maximizing the non-terrestrial fuel level 320. In addition, the selection module 528 can select the departure point 218, the arrival point 220, the ground navigation route 208, the non-terrestrial navigation route 210, or a combination hereof in order to minimize the fuel cost 322.

The selection module 528 can adjust the length of the non-terrestrial travel segment 214 and the ground travel segment 212 based on a differential between the fuel cost 322 of non-terrestrial fuel and ground fuel. For example, if the fuel cost 322 of non-terrestrial fuel exceeds ground fuel, the selection module 528 can select an instance of the departure candidate point 222 further away from the starting location, such as the current location 230 or the user-defined location, and also select an instance of the arrival candidate point 224 further away from the destination 234.

Alternatively, the selection module 528 can bypass the non-terrestrial travel segment 214 altogether to minimize the fuel cost 322. For example, when the differential between the fuel cost 322 of non-terrestrial fuel and ground fuel exceeds a threshold predetermined by the navigation system 100, the selection module 528 can select a ground-based navigation route directly from the starting location to the destination 234.

The selection module 528 can also balance the user preference to meet the time constraint 316 with the fuel constraint 314, the safety condition 308, or a combination thereof. More specifically, the selection module 528 can prioritize a preference of the user to minimize the total travel time 330 of FIG. 2 over the fuel constraint 314, the safety condition 308, or a combination thereof.

The selection module 528 can select the non-terrestrial navigation route 210, the arrival point 220, or a combination thereof based on the road traffic condition 236 of the ground travel segment 212. For example, the selection module 528 can select the non-terrestrial navigation route 210 and the arrival point 220 from multiple instances of the arrival candidate point 224 based on the road traffic condition 236 of multiple instances of the arrival ground route 232 from multiple instances of the arrival candidate point 224 to the destination 234.

As a more specific example, the selection module 528 can select an airport further away from the destination 234 as the arrival point 220 over an airport closer to the destination 234. In this example, the selection module 528 can select the airport further away from the destination 234 as the arrival point 220 when the road traffic condition 236 of the arrival ground route 232 from the further airport to the destination 234 results in a shorter instance of the total travel time 330.

Moreover, the selection module 528 can also select the non-terrestrial navigation route 210, the arrival point 220, or a combination thereof based on the holding pattern 240 associated with one or more instances of the arrival candidate point 224. For example, the selection module 528 can select the airport further away from the destination 234 as the arrival point 220 when the holding pattern 240 at the further airport includes shorter holding times resulting in a shorter instance of the total travel time 330.

Additionally, the selection module 528 can also select the non-terrestrial navigation route 210 based on an approach direction to the arrival point 220 resulting in a shorter instance of the holding pattern 240 associated with the arrival point 220. For example, the arrival point 220 can have two instances of the holding pattern 240, a shorter instance of the holding pattern 240 for aircrafts approaching from an easterly direction and a longer instance of the holding pattern 240 for aircrafts approaching from a westerly direction. In this example, the selection module 528 can select a longer instance of the non-terrestrial navigation route 210 to approach the arrival point 220 from the easterly direction.

The selection module 528 can also select the departure point 218, the arrival point 220, the ground navigation route 208, or a combination thereof based on the non-terrestrial traffic condition 238. For example, the selection module 528 can select the arrival point 220 from multiple instances of the arrival candidate point 224 based on the non-terrestrial traffic condition 238 heading into the multiple instances of the arrival candidate point 224.

As a more specific example, the selection module 528 can select the airport with the shortest queue of aircrafts waiting or scheduled to land at the airport as the arrival point 220. Moreover, the selection module 528 can also select the departure point 218 based on the non-terrestrial traffic condition 238. For example, the selection module 528 can select the departure point 218 from multiple instances of the departure candidate point 222 based on the non-terrestrial traffic condition 238 heading out of the multiple instances of the departure candidate point 222.

In this example, once the selection module 528 has selected the departure point 218, the selection module 528 can select the departure ground route 228 from the starting location to the departure point 218. In the case where the user prefers to minimize the total travel time 330, the selection module 528 can select the departure ground route 228 with the shortest travel time.

The selection module 528 can receive the user preference from a user input. In addition, the user preference can be predetermined by the navigation system 100. Moreover, the selection module 528 can receive the user preference from a device connected to the navigation system 100.

It has been discovered that generating the composite navigation route 206 by balancing the safety condition 308 with the resource constraint 312 provides for a more personalized navigation experience by generating the composite navigation route 206 based on a preference of the user. As an example, generating the composite navigation route 206 by prioritizing a preference of the user to maximize the safety condition 308 over the resource constraint 312 results in an instance of the composite navigation route 206 which is tailored to the user's risk tolerance.

It has also been discovered that generating the composite navigation route 206 based on the non-terrestrial navigation route 210 and the ground navigation route 208 improves the usability of the first device 102. As an example, the first device 102 of the navigation system 100 can now be utilized to provide navigation instructions to vehicles or modes of transportation with both ground-based and non-ground-based transportation capabilities.

The selection module 528 can generate the composite navigation route 206 by combining the ground navigation route 208 including the departure ground route 228 and the arrival ground route 232 with the non-terrestrial navigation route 210. The selection module 528 can generate the composite navigation route 206 as soon as a device of the navigation system 100 such as the first device 102 or the second device 106 receives the destination 234 from a user of the navigation system 100 or a device connected to the navigation system 100.

Moreover, the selection module 528 can also generate the composite navigation route 206 when the destination 234 or the starting location is determined by the navigation system 100 based on information from an address book application, a calendar application, an itinerary application, or a combination thereof. In any case, the selection module 528 can generate the composite navigation route 206 before the multimodal vehicle 204 arrives at the departure point 218.

The selection module 528 can store the composite navigation route 206 in the first storage unit 414, the second storage unit 446, or a combination thereof. The selection module 528 can also use the first user interface 418, the second user interface 438, or a combination thereof to communicate the composite navigation route 206.

The route generation module 522 can be part of the first software 426, the second software 442, or a combination thereof. The first control unit 412 can execute the first software 426, the second control unit 434 can execute the second software 442, or a combination thereof to generate the composite navigation route 206.

Moreover, the route generation module 522 can also communicate the composite navigation route 206 between devices through the first communication unit 416, the second communication unit 436, or a combination thereof. After generating the composite navigation route 206, the control flow can pass from the route generation module 522 to the update module 530.

The update module 530 is configured to dynamically regenerate or update the composite navigation route 206. The update module 530 can dynamically regenerate or update the composite navigation route 206 once the multimodal vehicle 204 has embarked on a portion of the composite navigation route 206.

The update module 530 can dynamically regenerate or update the composite navigation route 206 based on the safety condition 308, the road traffic condition 236, the non-terrestrial traffic condition 238, or a combination thereof. For example the update module 530 can dynamically regenerate the composite navigation route 206 based on a change in the safety condition 308, the road traffic condition 236, and the non-terrestrial traffic condition 238 at the arrival point 220.

Once the multimodal vehicle 204 has embarked on a portion of the composite navigation route 206, the update module 530 can periodically query the arrival point 220 for an updated instance of the safety condition 308, the road traffic condition 236, the non-terrestrial traffic condition 238, or a combination thereof at the arrival point 220 while traversing the ground travel segment 212 or the non-terrestrial travel segment 214. In addition, the update module 530 can dynamically regenerate the composite navigation route 206 when the update module 530 receives an alert or notification from the departure point 218, the arrival point 220, or a combination thereof.

The update module 530 can also query the arrival point 220 for an updated instance of the safety condition 308, the road traffic condition 236, the non-terrestrial traffic condition 238, or a combination thereof when the geo-dome module 512 detects the multimodal vehicle has entered the geo-dome 242. For example, the radius of the geo-dome 242 can be 6 miles and the update module 530 can query the arrival point 220 for an updated instance of the safety condition 308, the road traffic condition 236, the non-terrestrial traffic condition 238, or a combination thereof when the multimodal vehicle 204 is detected within the 6 mile radius.

Upon receiving the updated instance of the safety condition 308, the road traffic condition 236, the non-terrestrial traffic condition 238, or a combination thereof, the update module 530 can compare the updated instance of the safety condition 308, the road traffic condition 236, the non-terrestrial traffic condition 238, or a combination thereof against the safety condition 308, the road traffic condition 236, the non-terrestrial traffic condition 238, or a combination thereof determined at the time the composite navigation route 206 was generated. The update module 530 can dynamically adjust or regenerate the composite navigation route 206 if any of the updated instances of the safety condition 308, the road traffic condition 236, or the non-terrestrial traffic condition 238 differs from the safety condition 308, the road traffic condition 236, or the non-terrestrial traffic condition 238 determined previously.

For example, the update module 530 can dynamically regenerate the composite navigation route 206 when the safety condition 308 at the arrival point 220 falls below VFR standards set by the FAA. As an additional example, the update module 530 can dynamically regenerate the composite navigation route 206 when the road traffic condition 236 at the arrival point 220 worsens as a result of an accident or road closure near the arrival point 220.

The update module 530 can dynamically regenerate the composite navigation route 206 by selecting a new instance of the departure point 218 or the arrival point 220, calculating a new instance of the departure ground route 228 or the arrival ground route 232, or a combination thereof. For example, the update module 530 can select a new instance of the arrival point 220 by selecting a different instance of the arrival candidate point 224. As an additional example, the update module 530 can select a new instance of the arrival point 220 by interacting with the geo-dome module 512 to increase the radius of the geo-dome 242 to search for additional instances of the arrival candidate point 224.

The update module 530 can also dynamically regenerate the composite navigation route 206 based on updates made to the resource constraint 312. For example, the update module 530 can select a new instance of the arrival point 220 or calculate a new instance of the arrival ground route 232 based on current levels of the non-terrestrial fuel level 320, the ground fuel level 318, or a combination thereof. As an additional example, the update module 530 can select a new instance of the arrival point 220 or calculate a new instance of the arrival ground route 232 based on an update to the time constraint 316.

It has been discovered that dynamically regenerating the composite navigation route 206 based on the road traffic condition 236, the non-terrestrial traffic condition 238, the safety condition 308, the resource constraint 312, or a combination thereof provides for an improved user experience. As an example, dynamically regenerating the composite navigation route 206 by selecting new instances of the arrival point 220 and the arrival ground route 232 based on a change in the road traffic condition 236, the non-terrestrial traffic condition 238, the safety condition 308, or a combination thereof within the geo-dome 242 ensures that the composite navigation route 206 is up to date and reflects the latest weather and traffic conditions near the destination 234.

The update module 530 can be part of the first software 426, the second software 442, or a combination thereof. The first control unit 412 can execute the first software 426, the second control unit 434 can execute the second software 442, or a combination thereof to dynamically regenerate the composite navigation route 206. Moreover, the update module 530 can also communicate the newly regenerated instance of the composite navigation route 206 between devices through the first communication unit 416, the second communication unit 436, or a combination thereof.

The physical transformation of the composite navigation route 206 results in the movement in the physical world, such as people using the first device 102, based on the operation of the navigation system 100. As the movement in the physical world occurs, the movement itself creates additional information that is converted back into updating the composite navigation route 206 for continuously guiding the multimodal vehicle 204 over the non-terrestrial travel segment 214 and the ground travel segment 212 that is displayable on the display interface 202 for the continued operation of the navigation system 100 and to continue movement in the physical world.

The modules describes in this application can be ordered or partitioned differently. For example, certain modules can be combined. Each of the modules can also operate individually and independently of the other modules. Furthermore, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The first storage unit 414, the second storage unit 446, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 6:
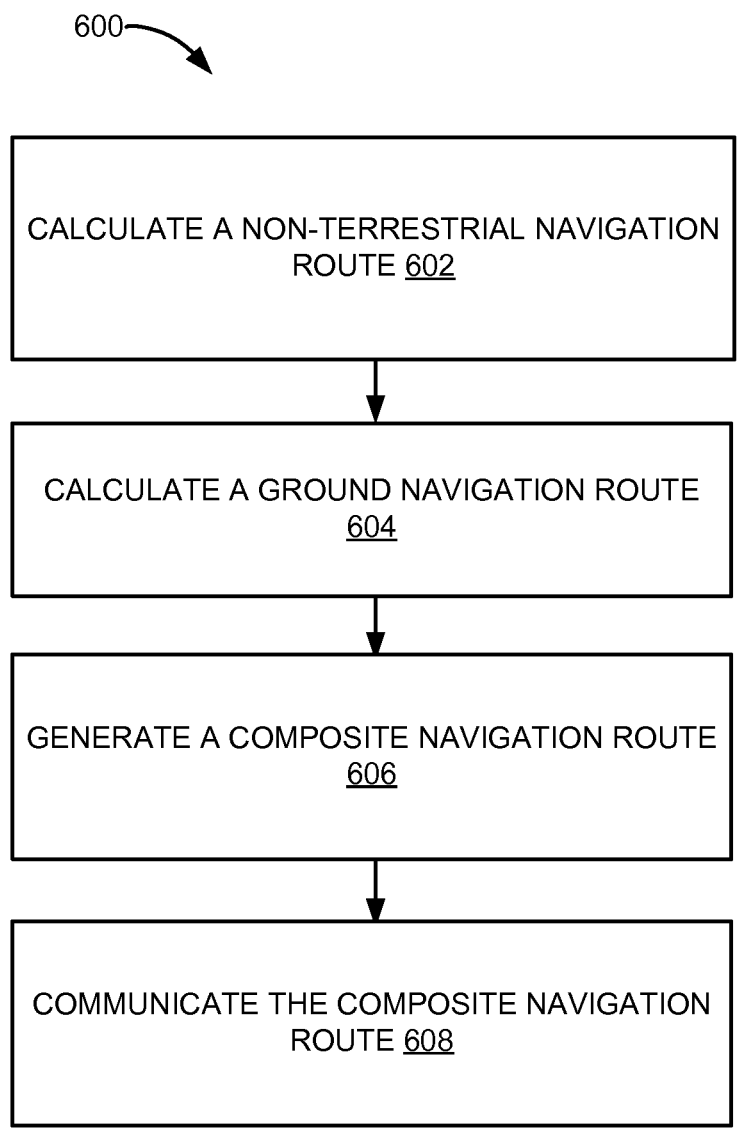
FIG. 6 is a flow chart of a method of operation of the navigation system in a further embodiment of the present invention.

Referring now to FIG. 6, therein is shown a flow chart of a method 600 of operation of the navigation system 100 of FIG. 1 in a further embodiment of the present invention. The method 600 includes: calculating, with a control unit 412 of FIG. 4 a non-terrestrial navigation route 210 of FIG. 2 for guiding a multimodal vehicle 204 of FIG. 2 during a non-terrestrial travel segment 214 of FIG. 2 in a block 602; calculating a ground navigation route 208 of FIG. 2 for guiding the multimodal vehicle 204 during a ground travel segment 212 of FIG. 2 beyond a mode-transition point 216 of FIG. 2 in a block 604; generating a composite navigation route 206 of FIG. 2 based on the non-terrestrial navigation route 210 and the ground navigation route 208 for continuously guiding the multimodal vehicle 204 over the non-terrestrial travel segment 214 and the ground travel segment 212 in a block 606; and communicating, with an interface unit 418 of FIG. 4 coupled to the control unit 412, the composite navigation route in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
a control unit including at least one processor, configured to:
calculate a non-terrestrial navigation route for guiding a multimodal vehicle during a non-terrestrial travel segment;
calculate a ground navigation route for guiding the multimodal vehicle during a ground travel segment beyond a mode-transition point;
generate a composite navigation route based on the non-terrestrial navigation route and the ground navigation route for continuously guiding the multimodal vehicle over the non-terrestrial travel segment and the ground travel segment, wherein the non-terrestrial navigation route is selected according to a road traffic condition of the ground travel segment; and
a storage unit including memory, coupled to the control unit, configured to store the composite navigation route.

2. The system as claimed in claim 1 wherein the control unit is further configured to generate the composite navigation route based on selecting the ground navigation route according to a non-terrestrial traffic condition.

3. The system as claimed in claim 1 wherein the control unit is further configured to generate the composite navigation route based on selecting the ground navigation route, the non-terrestrial navigation route, or a combination thereof according to a resource constraint.

4. The system as claimed in claim 1 wherein the control unit is further configured to generate the composite navigation route based on selecting the non-terrestrial navigation route according to a holding pattern associated with the mode-transition point.

5. The system as claimed in claim 1 wherein the control unit is further configured to:
generate a geo-dome around a destination; and
generate the composite navigation route to the destination based on a road traffic condition within the geo-dome.

6. The system as claimed in claim 1 wherein the control unit is further configured to determine the mode-transition point based on a current location, a destination, or a combination thereof.

7. A method of operation of a navigation system comprising:
calculating a non-terrestrial navigation route for guiding a multimodal vehicle during a non-terrestrial travel segment;
calculating a ground navigation route for guiding the multimodal vehicle during a ground travel segment beyond a mode-transition point; and
generating with a control unit including at least one processor, a composite navigation route based on the non-terrestrial navigation route and the ground navigation route for communicating the composite navigation route and continuously guiding the multimodal vehicle over the non-terrestrial travel segment and the ground travel segment, wherein the non-terrestrial navigation route is selected according to a road traffic condition of the ground travel segment.

8. The method as claimed in claim 7 wherein generating the composite navigation route includes selecting the ground navigation route according to a non-terrestrial traffic condition.

9. The method as claimed in claim 7 wherein generating the composite navigation route includes selecting the ground navigation route, the non-terrestrial navigation route, or a combination thereof according to a resource constraint.

10. The method as claimed in claim 7 wherein generating the composite navigation route includes selecting the non-terrestrial navigation route according to a holding pattern associated with the mode-transition point.

11. The method as claimed in claim 7 further comprising:
generating a geo-dome around a destination; and
generating the composite navigation route to the destination based on a road traffic condition within the geo-dome.

12. The method as claimed in claim 7 further comprising determining the mode-transition point based on a current location, a destination, or a combination thereof.

13. A non-transitory computer readable medium, including instructions for execution, comprising:
calculating a non-terrestrial navigation route for guiding a multimodal vehicle during a non-terrestrial travel segment;
calculating a ground navigation route for guiding the multimodal vehicle during a ground travel segment beyond a mode-transition point; and
generating a composite navigation route based on the non-terrestrial navigation route and the ground navigation route for communicating the composite navigation route and continuously guiding the multimodal vehicle over the non-terrestrial travel segment and the ground travel segment, wherein the non-terrestrial navigation route is selected according to a road traffic condition of the ground travel segment.

14. The non-transitory computer readable medium as claimed in claim 13 wherein generating the composite navigation route includes selecting the ground navigation route according to a non-terrestrial traffic condition.

15. The non-transitory computer readable medium as claimed in claim 13 wherein generating the composite navigation route includes selecting the ground navigation route, the non-terrestrial navigation route, or a combination thereof according to a resource constraint.

16. The non-transitory computer readable medium as claimed in claim 13 wherein generating the composite navigation route includes selecting the non-terrestrial navigation route according to a holding pattern associated with the mode-transition point.

17. The non-transitory computer readable medium as claimed in claim 13 further comprising:
generating a geo-dome around a destination; and generating the composite navigation route to the destination based on a road traffic condition within the geodome.

\* \* \* \* \*